(12) United States Patent
McKay et al.

(10) Patent No.: US 9,521,397 B2
(45) Date of Patent: Dec. 13, 2016

(54) SYSTEM AND METHOD FOR SELECTING A TWO-DIMENSIONAL REGION OF INTEREST USING A RANGE SENSOR

(71) Applicant: GM GLOBAL TECHNOLOGY OPERATIONS LLC, Detroit, MI (US)

(72) Inventors: Neil David McKay, Chelsea, MI (US); James W. Wells, Rochester Hills, MI (US); Roland J. Menassa, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 353 days.

(21) Appl. No.: 14/204,119

(22) Filed: Mar. 11, 2014

(65) Prior Publication Data

US 2015/0264332 A1 Sep. 17, 2015

(51) Int. Cl.
| | |
|---|---|
| G01S 7/48 | (2006.01) |
| H04N 13/02 | (2006.01) |
| G01S 17/02 | (2006.01) |
| G01S 17/89 | (2006.01) |
| G06K 9/00 | (2006.01) |
| G06K 9/32 | (2006.01) |

(52) U.S. Cl.
CPC ......... *H04N 13/0203* (2013.01); *G01S 7/4808* (2013.01); *G01S 17/023* (2013.01); *G01S 17/89* (2013.01); *G06K 9/00791* (2013.01); *G06K 9/3233* (2013.01)

(58) Field of Classification Search
None
See application file for complete search history.

(56) References Cited

PUBLICATIONS

Jia, Tingxiang, et al. "Calibration of a 3D laser range finder and a camera based on stereoscopic checkerboard." Vehicular Electronics and Safety (ICVES), 2011 IEEE International Conference on. IEEE, 2011.*
Johnny, P., and N. D. Guilherme. "3D Modeling of Real-World Objects Using Range and Intensity Images." Innovations in Machine Intelligence and Robot Perception (2004).*
Gupta, Alok. "Range image segmentation for 3-D object recognition." (1988).*

(Continued)

*Primary Examiner* — Sath V Perugavoor
*Assistant Examiner* — Clifford Hilaire
(74) *Attorney, Agent, or Firm* — Quinn Law Group, PLLC

(57) ABSTRACT

A system includes a first camera defining a first camera coordinate system ($C_1$) and configured to acquire a first image of a scene. A range sensor is spaced a first distance from the first camera and defines a range sensor coordinate system (R). A controller is operatively connected to the first camera and range sensor. The controller has a processor and a tangible, non-transitory memory device on which is recorded instructions for executing a method for obtaining a two-dimensional region of interest ($u_1^*$, $v_1^*$) in the first image, which is a two-dimensional intensity image. The first image is represented by a plurality of first points ($u_1$, $v_1$) in a first image plane. The controller is configured to acquire a range image of the scene with the range sensor. The range image is represented by a plurality of second points ($u_2$, $v_2$, d) in a second image plane.

11 Claims, 2 Drawing Sheets

(56) References Cited

PUBLICATIONS

Moosmann, Frank, and Thierry Fraichard. "Motion estimation from range images in dynamic outdoor scenes." Robotics and Automation (ICRA), 2010 IEEE International Conference on. IEEE, 2010.*
Jew, Denis Kliment, Norman Hendrich, and Jianwei Zhang. "Multi sensor fusion of camera and 3D laser range finder for object recognition."Multisensor Fusion and Integration for Intelligent Systems (MFI), 2010 IEEE Conference on. IEEE, 2010.*

* cited by examiner

SYSTEM AND METHOD FOR SELECTING A TWO-DIMENSIONAL REGION OF INTEREST USING A RANGE SENSOR

TECHNICAL FIELD

The disclosure relates generally to a system and method for selecting a two-dimensional region of interest in a two-dimensional image using a range sensor.

BACKGROUND

Two-dimensional images obtained from conventional digital cameras may include distracting and irrelevant clutter, for example, in the background or other parts of the image. Typically, segmentation of the two-dimensional image may involve physical modification of the environment, such as adding a curtain to remove irrelevant background clutter. Electronic segmentation of the two-dimensional image using only two-dimensional cues may be time-consuming.

SUMMARY

A system includes a first camera defining a first camera coordinate system ($C_1$) and configured to acquire a first image of a scene. A range sensor is spaced a first distance from the first camera and defines a range sensor coordinate system (R). For example, the lens of the first camera and the sensor portion of the range sensor may be positioned at the origins of the first camera coordinate system ($C_1$) and range sensor coordinate system (R), respectively.

A controller is operatively connected to the first camera and range sensor. The first camera, the controller and the range sensor may be part of a single device. The controller has a processor and a tangible, non-transitory memory device on which is recorded instructions for executing a method for obtaining a two-dimensional region of interest ($u_1^*$, $v_1^*$) in the first image, which is a two-dimensional intensity image.

Execution of the instructions by the processor causes the controller to acquire a first image of the scene with the first camera. The first image is represented by a plurality of first points ($u_1$, $v_1$) in a first image plane. The controller is configured to acquire a range image of the scene with the range sensor. The range image is represented by a plurality of second points ($u_2$, $v_2$, d) in a second image plane. Each of the plurality of second points ($u_2$, $v_2$, d) in the range image includes a range distance (d) corresponding to a respective distance from the range sensor to the objects in the scene.

The controller is configured to convert the range image to a three-dimensional sample of points ($x_2$, $y_2$, $z_2$) in the range sensor coordinate system (R); and select a three-dimensional region of interest ($x_2^*$, $y_2^*$, $z_2^*$) in the range sensor coordinate system (R) from the three-dimensional sample of points ($x_2$, $y_2$, $z_2$). The selected three-dimensional region of interest ($x_2^*$, $y_2^*$, $z_2^*$) in the range sensor coordinate system (R) may include only objects in the scene that are less than a minimum distance from the range sensor. A spatial location of each of the selected points in the three-dimensional volume may be a function of the range distance (d). The selected three-dimensional region of interest ($x_2^*$, $y_2^*$, $z_2^*$) in the range sensor coordinate system (R) may include only objects in the scene within or on the surface of a three-dimensional volume. A spatial location of each of the selected points in the three-dimensional volume may be a function of time such that the position, size or shape of the three-dimensional volume may change over time.

The controller is configured to transform the three-dimensional region of interest from the range sensor coordinate system (R) to the first camera coordinate system ($C_1$) [($x_2^*$, $y_2^*$, $z_2^*$) to ($x_1^*$, $y_1^*$, $z_1^*$)]. The controller is configured to map the three-dimensional region of interest ($x_1^*$, $y_1^*$, $z_1^*$) in the first camera coordinate system ($C_1$) onto the first image plane to obtain the two-dimensional region of interest ($u_1^*$, $v_1^*$).

The first camera may be a digital camera. Utilizing a range image with distance information can provide fast and cost-effective ways to segment two-dimensional images, thus speeding up the process of analyzing the two-dimensional images. The system reduces the portion of the image for which other more computationally-expensive algorithms are to be performed, resulting in an overall speedup of vision processing. This can, for example, prevent false matches when searching two-dimensional intensity images.

The above features and advantages and other features and advantages of the present invention are readily apparent from the following detailed description of the best modes for carrying out the invention when taken in connection with the accompanying drawings.

DETAILED DESCRIPTION

Figure 1:
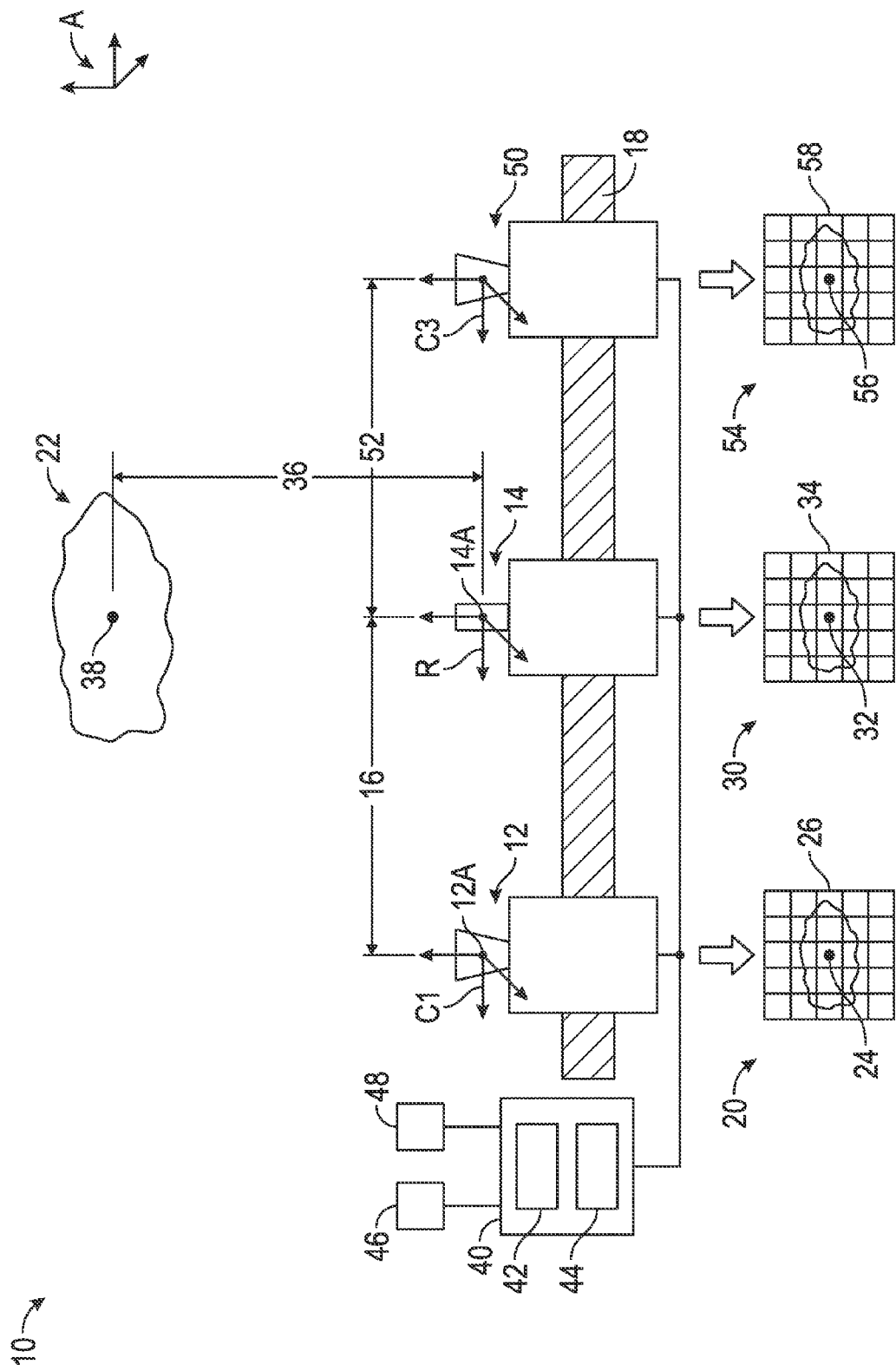
FIG. 1 is a schematic diagram of a system having a first camera, range sensor and a controller.

Referring to the Figures, wherein like reference numbers refer to the same or similar components throughout the several views, FIG. 1 illustrates a system 10 having a first camera 12 defining a first camera coordinate system ($C_1$). The system 10 may take many different forms and include multiple and/or alternate components and facilities. While an example system 10 is shown in the Figures, the components illustrated in the Figures are not intended to be limiting. Indeed, additional or alternative components and/or implementations may be used.

Referring to FIG. 1, a range sensor 14 is spaced a first distance 16 from the first camera 12 and defines a range sensor coordinate system (R). In one example, the lens 12A of the first camera 12 and the sensor portion 14A of the range sensor 14 may be positioned at the origins of the first camera coordinate system ($C_1$) and range sensor coordinate system (R), respectively. The first camera 12 and range sensor 14 may be rigidly mounted on a mounting bracket 18 to define a fixed geometric or spatial relationship.

Referring to FIG. 1, the first camera 12 is configured to acquire a first image 20 of a scene 22. The first image 20 is represented by a plurality of first points 24 ($u_1$, $v_1$) in a first image plane 26. The first image 20 may be a grid of two-dimensional points representing a grayscale or color intensity image. The first camera 12 may be a two-dimensional digital camera.

Referring to FIG. 1, the range sensor 14 is configured to acquire a range image 30 of the scene. The range image 30 is defined by a plurality of second points 32 ($u_2$, $v_2$, d) in a second image plane 34. The range sensor 14 produces a two-dimensional image showing the respective distance, referred to herein as the range distance 36, from the sensor portion 14A of the range sensor 14 to each object (such as object 38) in the scene.

In one example, the range sensor 14 is an infrared time-of-flight sensor which resolves distance based on the known speed of light, measuring the time-of-flight of a light signal between the range sensor 14 and each point in the scene 22. As known to those skilled in the art, the range distance 36 (d) may be calibrated using a calibration plate (not shown). The range sensor 14 may be calibrated such that the range distance 36 is given directly in physical units, such as feet or meters. The range sensor 14 may return both a range image and an exactly-registered infrared intensity image.

Referring to FIG. 1, the first camera 12 may include at least one lens 12A and/or filters (not shown) adapted to receive and/or shape light from the scene 22 onto an image sensor (not shown). The image sensor may include, for example, one or more charge-coupled devices (CCDs) configured to convert light energy into a digital signal. The charge-coupled device is an analog device that creates a small electrical charge in each photo sensor when impacted by light. The charges are converted to voltage one pixel at a time as they are read from the chip and turned into digital data using additional circuitry. The image sensor may include a complementary metal-oxide-semiconductor chip (CMOS), which is an active pixel sensor having circuitry next to each photo sensor converting the light energy to a voltage, which is then converted to digital data using additional circuitry on the chip.

Referring to FIG. 1, a controller 40 is operatively connected to the first camera 12 and range sensor 14. The first camera 12, the controller 40 and the range sensor 14 may be part of a single device. Referring to FIG. 1, the controller 40 has a processor 42 and tangible, non-transitory memory 44 on which are recorded instructions for executing a method or process 100 for obtaining a two-dimensional region of interest ($u_1^*$, $v_1^*$) in the first image 20 using the information obtained by the range sensor 14. The process 100 resides within the controller 40 or is otherwise readily executable by the controller 40. Process 100 will be described in detail below with reference to FIG. 2.

Referring to FIG. 1, the controller 40 may include an input device 46 and an output device 48 to interact with a user (not shown). The input device 46 may include any device that allows the user to provide information or commands to the controller 40. The input device 46 may include, for example, a computer mouse and/or keyboard. The output device 48 may include any device configured to present information to the user. Thus, the output device 48 may include a display screen or computer monitor, such as a liquid crystal display (LCD) screen.

Optionally, a second camera 50 may be operatively connected to the controller 40. The second camera 50 may be spaced a second distance 52 from the range sensor 14 and rigidly mounted on the mounting bracket 18 to define a fixed geometric relationship. The second camera 50 defines a second camera coordinate system ($C_2$). The second camera 50 may be configured to acquire a third image 54 of the scene 22. The third image 54 is defined by a plurality of third points 56 ($u_3$, $v_3$) in a third image plane 58. The first and second cameras 12, 50, the controller 40 and the range sensor 14 may be part of a single device.

Figure 2:
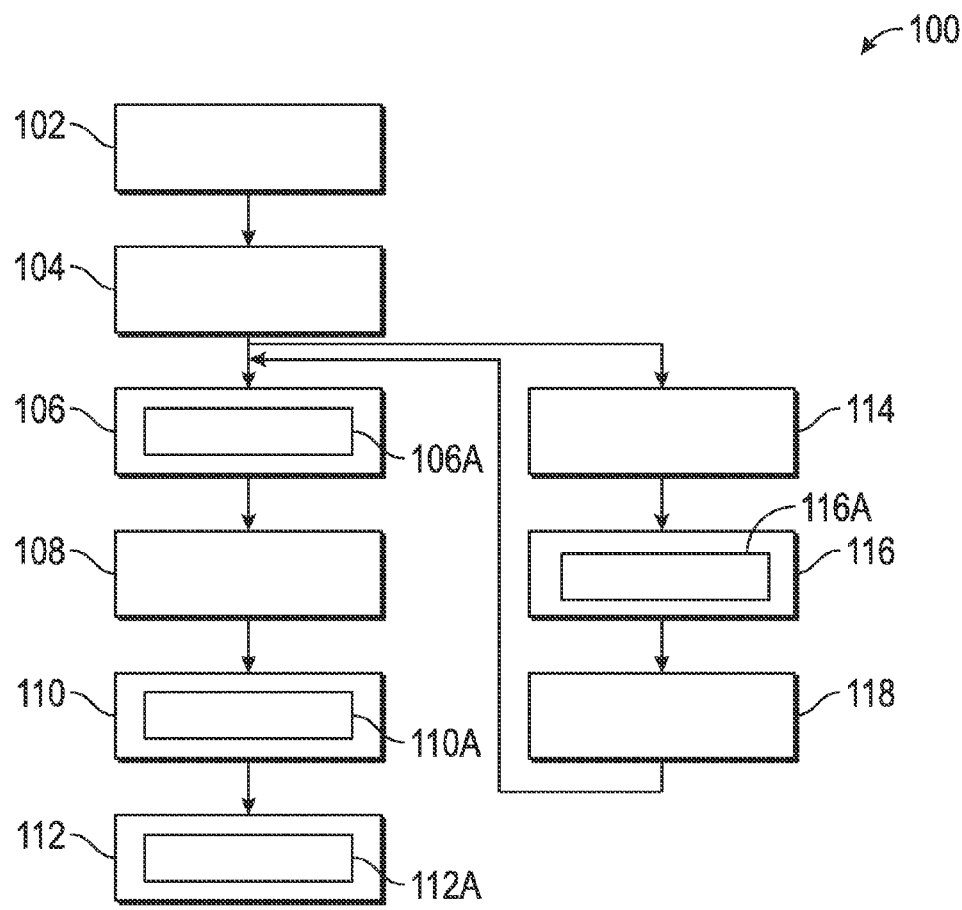
FIG. 2 is a flow chart of a process implemented by the controller of FIG. 1 for obtaining a two-dimensional region of interest in a two-dimensional first image produced by the first camera of FIG. 1.

Referring now to FIG. 2, process 100 may begin with step 102 where the controller 40 is configured to acquire the first image 20 of the scene 22 with the first camera 12. As noted above, the first image 20 is represented by a plurality of first points ($u_1$, $v_1$) in the first image plane 26. The steps 102 to 118 of FIG. 2 may be carried out in an order other than the order described below and some steps may be omitted. In step 104 of FIG. 2, the controller 40 is configured to acquire the range image 30 of the scene 22 with the range sensor 14.

In step 106 of FIG. 2, the controller 40 is configured to convert the range image 30, represented by the plurality of second points 32 ($u_2$, $v_2$, d) in the second image plane 34, to a three-dimensional sample of points ($x_2$, $y_2$, $z_2$) in the range sensor coordinate system (R). Step 106 may include a sub-step 106A to obtain a conversion matrix ($P_2$) for converting the range sensor coordinate system (R) to the second image plane 34 such that:

$$P_2 \begin{bmatrix} x2 \\ y2 \\ z2 \end{bmatrix} = \begin{bmatrix} u2 \\ v2 \\ d \end{bmatrix}$$

The conversion matrix ($P_2$) may be determined from characteristics of the range sensor 14, such as its focal length. In step 106, an inverse of the conversion matrix ($P_2$) is used to convert the range image 30 ($u_2$, $v_2$, d) to the three-dimensional sample of points ($x_2$, $y_2$, $z_2$) such that:

$$P_2^{-1} \begin{bmatrix} u2 \\ v2 \\ d \end{bmatrix} = \begin{bmatrix} x2 \\ y2 \\ z2 \end{bmatrix}$$

In step 108 of FIG. 2, the controller 40 is configured to select a three-dimensional region of interest ($x_2^*$, $y_2^*$, $z_2^*$) from the three-dimensional sample of points ($x_2$, $y_2$, $z_2$) in the range sensor coordinate system (R). The selected three-dimensional region of interest ($x_2^*$, $y_2^*$, $z_2^*$) may be dependent on the range distance 36 (d) (i.e. as a range-data-dependent selection volume). For example, the three-dimensional region of interest may be selected to be a region around whatever object 38 is closest to the range sensor 14. The selected three-dimensional region of interest ($x_2^*$, $y_2^*$, $z_2^*$) or volume's position, size, and shape may all be functions of range distance 36 (d), rather than just being fixed volumes in space. The selected three-dimensional region of interest ($x_2^*$, $y_2^*$, $z_2^*$) may include only objects 38 (see FIG. 2) in the scene 22 that are less than a minimum distance from the range sensor.

In one embodiment, the selected three-dimensional region of interest ($x_2^*$, $y_2^*$, $z_2^*$) includes only objects 38 in the scene 22 within or on the surface of a predefined three-dimensional volume (such as volume 312 shown in FIG. 3A and described below). The three-dimensional volume may be a cube, cylinder, rectangular prism, cone, triangular prism or any other regular or irregular three-dimensional shape. The three-dimensional volume defines selected points. In one example, the spatial location of each of the selected points in the three-dimensional volume may be a function of time such that the position, size or shape of the three-dimensional volume may change over time. This allows, for example, tracking of a movable object (such as object-of-interest 304 shown in FIGS. 3A and 3B).

In step 110 of FIG. 2, the controller 40 is configured to transform the three-dimensional region of interest ($x_2^*$, $y_2^*$, $z_2^*$) in the range sensor coordinate system (R) to a three-dimensional region of interest ($x_1^*$, $y_1^*$, $z_1^*$) in the first camera coordinate system ($C_1$). Referring to FIG. 1, the three-dimensional regions of interest ($x_2^*$, $y_2^*$, $z_2^*$) and ($x_1^*$, $y_1^*$, $z_1^*$) are identical in an absolute space coordinate system A. Step 110 involves transforming the three-dimensional region of interest from one coordinate frame to another. Step 110 may include a sub-step 110A to obtain a first transformation matrix ($T_{21}$) for converting the range sensor coordinate system (R) to the first camera coordinate system ($C_1$) such that:

$$T_{21}\begin{bmatrix} x2 \\ y2 \\ z2 \end{bmatrix} = \begin{bmatrix} x1 \\ y1 \\ z1 \end{bmatrix}$$

The first transformation matrix ($T_{21}$) may be determined from the known spatial or geometric relationship between the first camera 12 and the range sensor 14. As is known to those skilled in the art, given two frames in three-dimensional space, it is possible to develop a transformation matrix that converts the coordinates from one frame to the coordinates of another if the geometric relationship between the two frames is known. The first camera 12 and the range sensor 14 may be positioned such that the range sensor coordinate system (R) and the first camera coordinate system ($C_1$) involve a simple translation of frames [such as ($x_2$, $y_2$, $z_2$) to ($x_1$, $y_1$, $z_1$)]. In one example, where the range sensor and first camera coordinate systems are related by a displacement along the y-axis of negative 5 units, the first transformation matrix ($T_{21}$) may be:

$$T_{21} = \begin{bmatrix} 1 & 0 & 0 & 0 \\ 0 & 1 & 0 & -5 \\ 0 & 0 & 1 & 0 \\ 0 & 0 & 0 & 1 \end{bmatrix}$$

Step 110 of FIG. 2 includes transforming the three-dimensional region of interest from the range sensor coordinate system (R) to the first camera coordinate system ($C_1$) [($x_2^*$, $y_2^*$, $z_2^*$) to ($x_1^*$, $y_1^*$, $z_1^*$)] using the first transformation ($T_{21}$) such that:

$$T_{21}\begin{bmatrix} x2* \\ y2* \\ z2* \end{bmatrix} = \begin{bmatrix} x1* \\ y1* \\ z1* \end{bmatrix}$$

In step 112 of FIG. 2, the controller 40 is configured to map the three-dimensional region of interest ($x_1^*$, $y_1^*$, $z_1^*$) onto the first image plane 26 to obtain the two-dimensional region of interest ($u_1^*$, $v_1^*$). Step 112 may include a sub-step 112A to obtain a projection matrix ($P_1$) for projecting the first camera coordinate system ($C_1$) to the first image plane 26 such that:

$$P_1\begin{bmatrix} x1 \\ y1 \\ z1 \end{bmatrix} = \begin{bmatrix} u1 \\ v1 \end{bmatrix}.$$

Step 112 for mapping the three-dimensional region of interest ($x_1^*$, $y_1^*$, $z_1^*$) onto the first image plane 26 to obtain the two-dimensional region of interest ($u_1^*$, $v_1^*$) may be carried out using the projection matrix ($P_1$) such that:

$$P_1\begin{bmatrix} x1* \\ y1* \\ z1* \end{bmatrix} = \begin{bmatrix} u1* \\ v1* \end{bmatrix}$$

Referring to FIG. 2, a second camera 50 (shown in FIG. 1) may be added with optional steps 114 to 118. The second camera 50 is spaced a second distance 52 from the range sensor 14 and defines a second camera coordinate system ($C_2$). In this example, in step 114 (after the acquiring of the range image 30 in step 104) the controller 40 is configured to acquire a third image 54 of the scene 22. Referring to FIG. 1 and as noted above, the third image 54 is defined by a plurality of third points 56 ($u_3$, $v_3$) in a third image plane 58.

In step 116 of FIG. 2, the controller 40 is configured to transform the plurality of third points 56 ($u_3$, $v_3$) from the third image plane 58 to the first image plane 26. Step 116 may include a sub-step 116A to determine a second transformation matrix ($T_{31}$) for converting the third image plane 58 to the first image plane 26. The second transformation matrix ($T_{31}$) may be determined from the known spatial or geometric relationship between the second camera 50, the first camera 12 and the range sensor 14. In one example, where the first and second camera coordinate systems are related by a displacement along the y-axis of 10 units, the second transformation matrix ($T_{31}$) may be:

$$T_{31} = \begin{bmatrix} 1 & 0 & 0 & 0 \\ 0 & 1 & 0 & 10 \\ 0 & 0 & 1 & 0 \\ 0 & 0 & 0 & 1 \end{bmatrix}$$

In step 118 of FIG. 2 (prior to the conversion of the range image 30 to the three-dimensional sample of points ($x_2$, $y_2$, $z_2$) in step 106) the controller 40 is configured to combine the third image 54 with the first image 20. Combining the images from the first and second cameras 12, 50 improves resolution and allows for the use of low-resolution digital cameras as the first and second cameras 12, 50. In one example, the first and second cameras 12, 50 are 5-megapixel color cameras. Additionally, other cameras may be employed with different overlapping fields of view, spectral sensitivity and/or high dynamic range, and unified through the process 100 above.

The process 100 of FIG. 2 may be employed for removal of background clutter. FIG. 3A is a schematic diagram of an example first image 302 of an object-of-interest 304, prior to implementation of the process 100. Referring to FIG. 3A, each of the circles 306 schematically represent other objects in a scene that are less than a given distance, for example 2 meters, from the first camera 12. Each of the triangles 308 schematically represent other objects that are more than the given distance from the first camera 12, i.e., background.

Figure 3A:
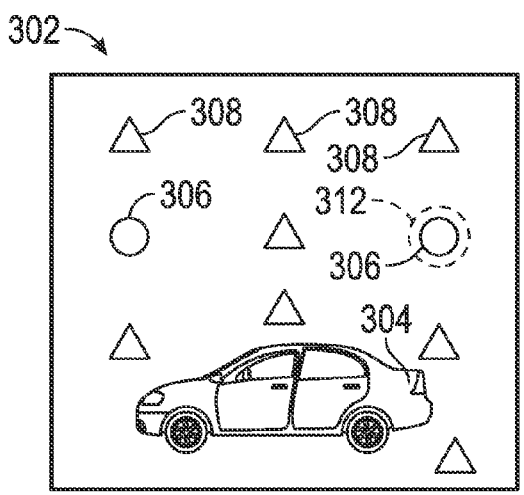
FIG. 3A is a schematic diagram of an example first image produced by the first camera of FIG. 1 prior to implementation of the process of FIG. 2.
Figure 3B:
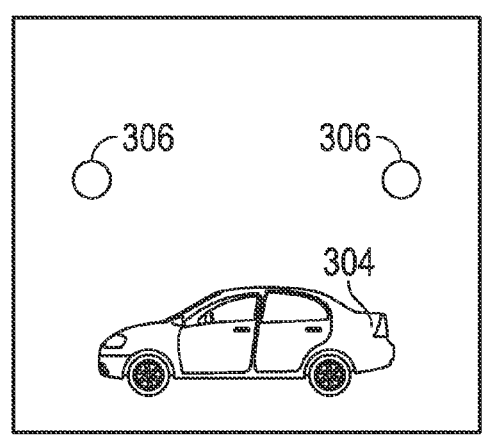
FIG. 3B is a schematic diagram of the first image of FIG. 3A after implementation of the process of FIG. 2.

FIG. 3B is a schematic diagram of a segmented first image 310, which represents the example first image 302 of FIG. 3A after implementation of the process 100. Here, the three-dimensional region of interest ($x_2^*$, $y_2^*$, $z_2^*$) was selected to include only objects that are less than a given distance from the first camera 12. Stated differently, FIG. 3B represents FIG. 3A after removal of all objects that are more than the given distance from the first camera 12. Alternatively, the three-dimensional region of interest ($x_2^*$, $y_2^*$, $z_2^*$) may be selected to include only objects in a scene within or on the surface of a predefined three-dimensional volume, such as volume 312 shown in FIG. 3A.

In summary, the data from the range sensor 14 is employed to select a two-dimensional region of interest in the first image 20, which is a two-dimensional intensity image. Referring to FIG. 1, the range sensor 14 is calibrated to the same coordinate system as the first camera 12. The range image 30 is merged with the two-dimensional first image 20 (color or monochrome) so that three-dimensional position data can be used as a criterion for selecting relevant parts of the first image 20. The range image 30 from the range sensor 14 is converted to a three-dimensional sample of points, which can be filtered to find only points in a three-dimensional region of interest. The three-dimensional region of interest is then mapped back onto the two-dimensional first image plane 26 of the first camera 12, yielding a two-dimensional region of interest in the first image 20.

This two-dimensional region of interest can then be processed by conventional computer vision techniques, while ignoring other non-relevant parts of the two-dimensional first image 20. Stated differently, a range image 30 from the range sensor 14 is used to segment a two-dimensional grayscale or color intensity image. This allows image segmentation that may be difficult or impossible without range distance 36 (see FIG. 1) information. This process can be accomplished with a low-resolution range sensor 14. The segmentation can significantly reduce the portion of the first image 20 that needs to be processed, thereby increasing the speed of the process.

The process 100 may be employed to segment a scene 22 where the structural elements in the field of view are very similar and have changing scale or random scale as a function of range distance 36 (d) such that typical techniques known to those skilled in the art are not suitable. With the process 100, an object 38 at the target range may be easily segmented for further analysis of internal features by the two-dimensional first and/or second cameras 12, 50. Additionally, the process 100 may be employed for range adaption where the segmentation target range is selected relative to the measurement of the nearest object 38 (of a minimum size) in the field of view or the farthest that could be an object or background plane. Once the closest object range is found, the segmentation may be done around that (this would segment the closest object) or an object or plane could be selected relative to the rear-most object or plane.

As noted above, the controller 40 of FIG. 1 may include a computing device that employs an operating system or processor 42 and memory 44 for storing and executing computer-executable instructions. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor 72 (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A system comprising:
a first camera defining a first camera coordinate system ($C_1$) and configured to acquire a first image of a scene;
a range sensor spaced a first distance from the first camera and defining a range sensor coordinate system (R);
a controller operatively connected to the first camera and range sensor, the controller having a processor and a tangible, non-transitory memory device on which is recorded instructions for executing a method for obtaining a two-dimensional region of interest ($u_1^*$, $v_1^*$) in the first image;
wherein execution of the instructions by the processor causes the controller to:
acquire the first image of the scene with the first camera, the first image being represented by a plurality of first points ($u_1$, $v_1$) in a first image plane;
acquire a range image of the scene with the range sensor, the range image being represented by a plurality of second points ($u_2$, $v_2$, d) in a second image plane;
convert the range image to a three-dimensional sample of points ($x_2$, $y_2$, $z_2$) in the range sensor coordinate system (R);

select a three-dimensional region of interest ($x_2^*$, $y_2^*$, $z_2^*$) in the range sensor coordinate system (R) from the three-dimensional sample of points ($x_2$, $y_2$, $z_2$);

wherein the selected three-dimensional region of interest ($x_2^*$, $y_2^*$, $z_2^*$) in the range sensor coordinate system (R) includes only objects in the scene on a surface of or within a three-dimensional volume, the three-dimensional volume defining selected points;

wherein a spatial location of each of the selected points is a function of time;

wherein the selected three-dimensional region of interest ($x_2^*$, $y_2^*$, $z_2^*$) in the range sensor coordinate system (R) includes only objects in the scene that are less than a minimum distance from the range sensor; and wherein said converting the range image to a three-dimensional sample of points ($x_2$, $y_2$, $z_2$) in the range sensor coordinate system (R) includes:
obtaining a conversion matrix ($P_2$) for converting the range sensor coordinate system (R) to the second image plane; and
using an inverse of the conversion matrix for converting the range image to the three-dimensional sample of points ($x_2$, $y_2$, $z_2$).

2. The system of claim 1, wherein:
each of the plurality of second points ($u_2$, $v_2$, d) in the range image includes a range distance (d) corresponding to a respective distance from the range sensor to the objects in the scene;
the selected three-dimensional region of interest ($x_2^*$, $y_2^*$, $z_2^*$) defines selected points, a spatial location of each of the selected points being a function of the range distance (d).

3. The system of claim 1, wherein the first camera, the controller and the range sensor are part of a single device.

4. The system of claim 1, wherein the controller is further configured to:
transform the three-dimensional region of interest from the range sensor coordinate system (R) to the first camera coordinate system ($C_1$) [($x_2^*$, $y_2^*$, $z_2^*$) to ($x_1^*$, $y_1^*$, $z_1^*$)]; and
map the three-dimensional region of interest ($x_1^*$, $y_1^*$, $z_1^*$) in the first camera coordinate system ($C_1$) onto the first image plane to obtain the two-dimensional region of interest ($u_1^*$, $v_1^*$).

5. The system of claim 4, wherein said transforming the three-dimensional region of interest from the range sensor coordinate system (R) to the first camera coordinate system ($C_1$) [($x_2^*$, $y_2^*$, $z_2^*$) to ($x_1^*$, $y_1^*$, $z_1^*$)] includes:
obtaining a first transformation matrix ($T_{21}$) for converting the range sensor coordinate system (R) to the first camera coordinate system ($C_1$).

6. The system of claim 4, wherein said mapping the three-dimensional region of interest ($x_1^*$, $y_1^*$, $z_1^*$) in the first camera coordinate system ($C_1$) onto the first image plane includes:
obtaining a projection matrix ($P_1$) for projecting the first camera coordinate system ($C_1$) to the first image plane.

7. The system of claim 4, further comprising:
a second camera spaced a second distance from the range sensor and defining a second camera coordinate system ($C_2$);
wherein the controller is configured to:
after said acquiring the range image, acquire a third image of the scene, the third image being defined by a plurality of third points ($u_3$, $v_3$) in a third image plane;
determine a second transformation matrix ($T_{31}$) for converting the third image plane to the first image plane;
transform the plurality of third points ($u_3$, $v_3$) from the third image plane to the first image plane via the second transformation matrix ($T_{31}$); and
prior to the conversion of the range image to the three-dimensional sample of points ($x_2$, $y_2$, $z_2$), combine the third image with the first image.

8. A method of obtaining a two-dimensional region of interest in a two-dimensional image, the method comprising:
acquiring a first image of a scene with a first camera, the first image being represented by a plurality of first points ($u_1$, $v_1$) in a first image plane, the first camera defining a first camera coordinate system ($C_1$);
acquire a range image of the scene with a range sensor, the range image being represented by a plurality of second points ($u_2$, $v_2$, d) in a second image plane;
wherein the range sensor is spaced a first distance from the first camera and defines a range sensor coordinate system (R);
converting the range image to a three-dimensional sample of points ($x_2$, $y_2$, $z_2$) in the range sensor coordinate system (R);
selecting a three-dimensional region of interest ($x_2^*$, $y_2^*$, $z_2^*$) in the range sensor coordinate system (R) from the three-dimensional sample of points ($x_2$, $y_2$, $z_2$);
transforming the three-dimensional region of interest from the range sensor coordinate system (R) to the first camera coordinate system ($C_1$) [($x_2^*$, $y_2^*$, $z_2^*$) to ($x_1^*$, $y_1^*$, $z_1^*$)];
mapping the three-dimensional region of interest ($x_1^*$, $y_1^*$, $z_1^*$) in the first camera coordinate system ($C_1$) onto the first image plane to obtain the two-dimensional region of interest ($u_1^*$, $v_1^*$);
wherein the selected three-dimensional region of interest ($x_2^*$, $y_2^*$, $z_2^*$) in the range sensor coordinate system (R) includes only objects in the scene on a surface of or within a three-dimensional volume, the three-dimensional volume defining selected points;
a spatial location of each of the selected points is a function of time;
wherein the selected three-dimensional region of interest ($x_2^*$, $y_2^*$, $z_2^*$) in the range sensor coordinate system (R) includes only objects in the scene that are less than a minimum distance from the range sensor; and
wherein said converting the range image to a three-dimensional sample of points ($x_2$, $y_2$, $z_2$) in the range sensor coordinate system (R) includes:
obtaining a conversion matrix ($P_2$) for converting the range sensor coordinate system (R) to the second image plane; and
using an inverse of the conversion matrix for converting the range image to the three-dimensional sample of points ($x_2$, $y_2$, $z_2$).

9. The method of claim 8, wherein said transforming the three-dimensional region of interest from the range sensor coordinate system (R) to the first camera coordinate system ($C_1$) [($x_2^*$, $y_2^*$, $z_2^*$) to ($x_1^*$, $y_1^*$, $z_1^*$)] includes:
obtaining a first transformation matrix ($T_{21}$) for converting the range sensor coordinate system (R) to the first camera coordinate system ($C_1$).

10. The method of claim 8, wherein said mapping the three-dimensional region of interest ($x_1^*$, $y_1^*$, $z_1^*$) in the first camera coordinate system ($C_1$) onto the first image plane includes:

obtaining a projection matrix ($P_1$) for projecting the first camera coordinate system ($C_1$) to the first image plane.

11. The method of claim 8, further comprising:

after said acquiring the second image, acquiring a third image of the scene with a second camera, the third image being defined by a plurality of third points ($u_3$, $v_3$) in a third image plane;

wherein the second camera is spaced a second distance from the range sensor and defines a second camera coordinate system ($C_2$);

determining a second transformation matrix ($T_{31}$) for converting the third image plane to the first image plane;

transforming the plurality of third points ($u_3$, $v_3$) from the third image plane to the first image plane via the second transformation matrix ($T_{31}$); and prior to the conversion of the range image to the three-dimensional sample of points ($x_2$, $y_2$, $z_2$), combining the third image with the first image.

* * * * *